C. F. KETTERING & W. A. CHRYST.
CASH REGISTER.
APPLICATION FILED MAY 4, 1909.

1,025,277.

Patented May 7, 1912.
7 SHEETS—SHEET 3.

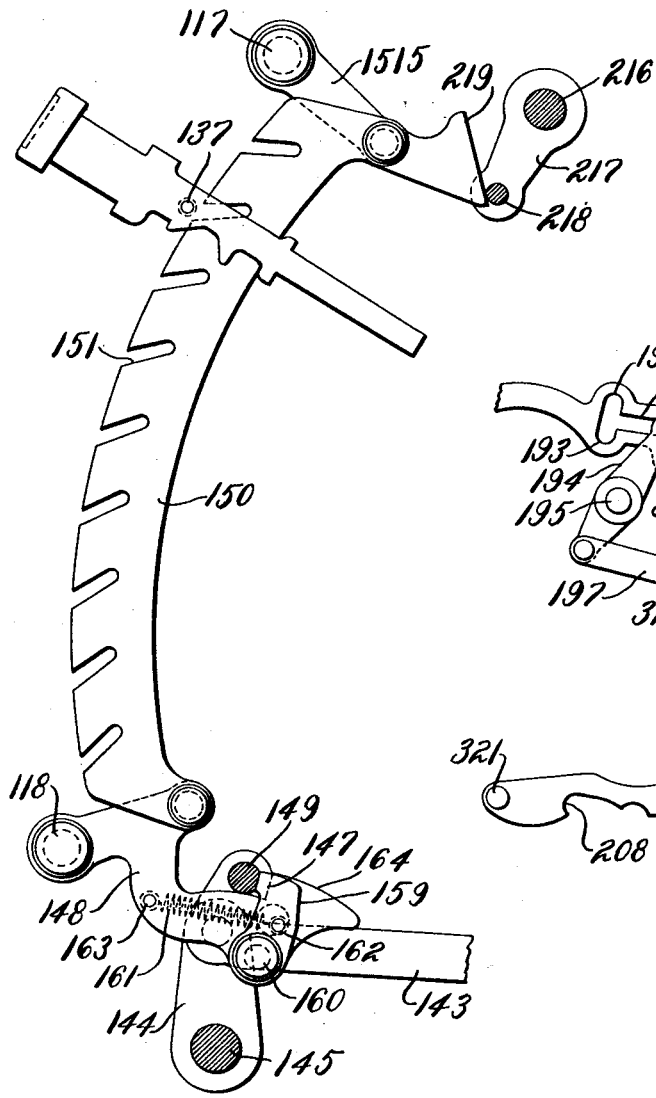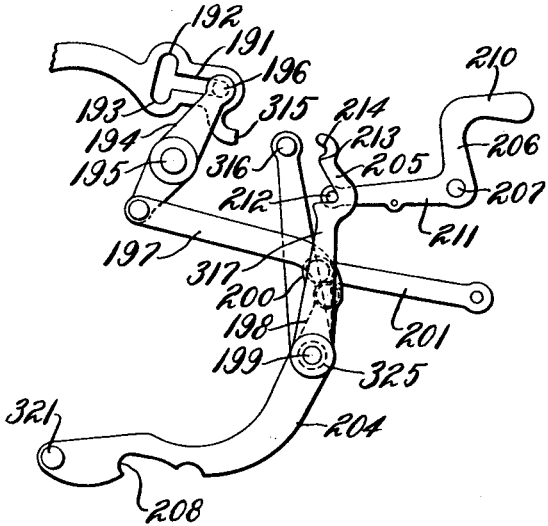

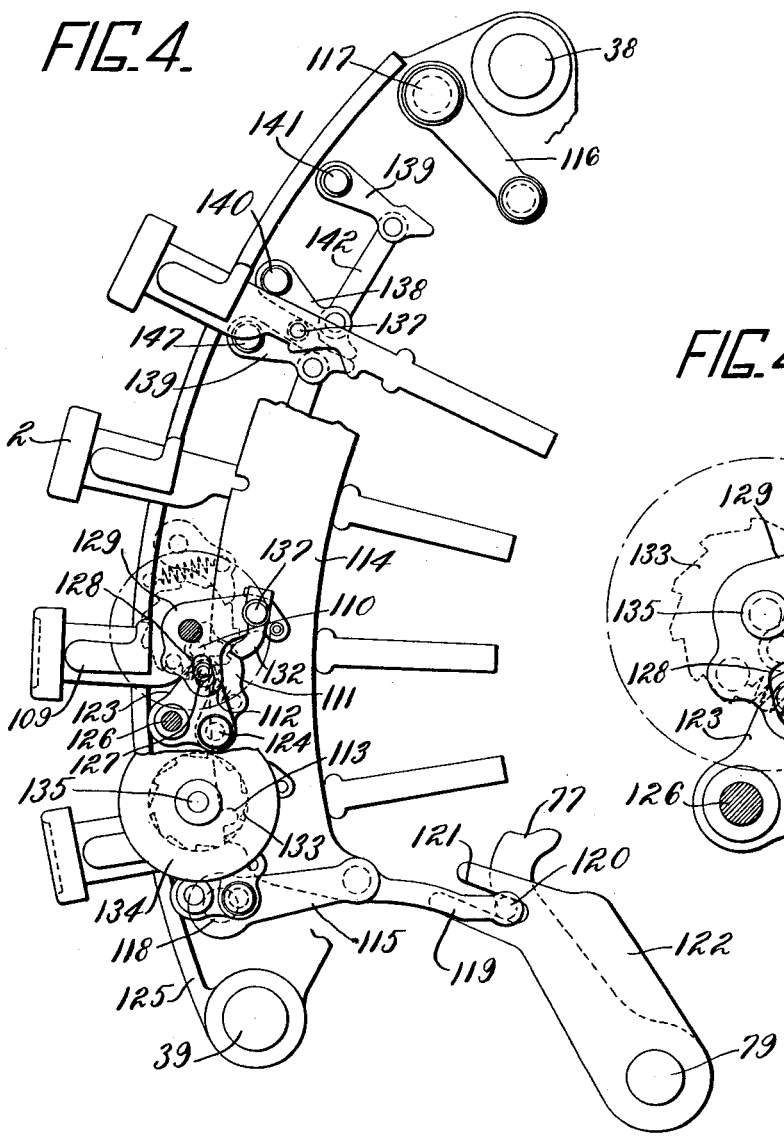
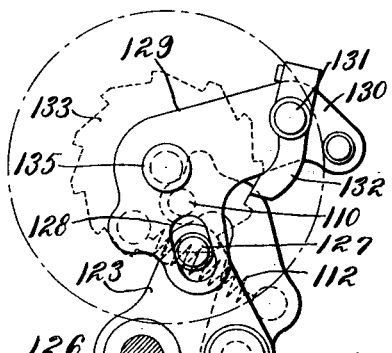

C. F. KETTERING & W. A. CHRYST.
CASH REGISTER.
APPLICATION FILED MAY 4, 1909.
1,025,277.
Patented May 7, 1912.
7 SHEETS—SHEET 6.
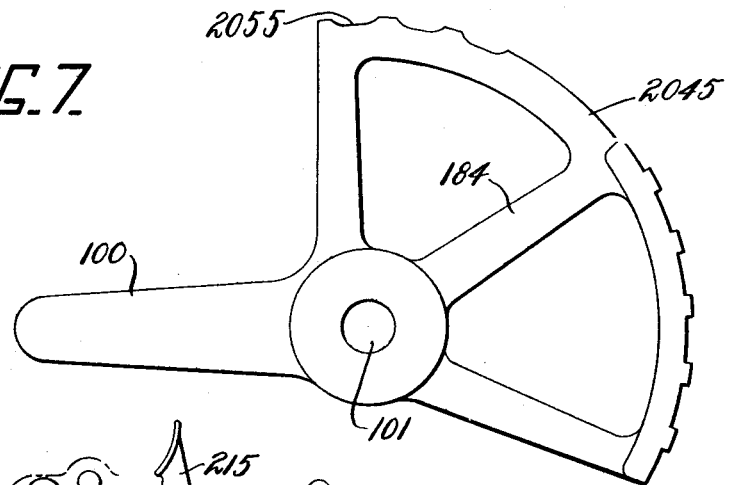
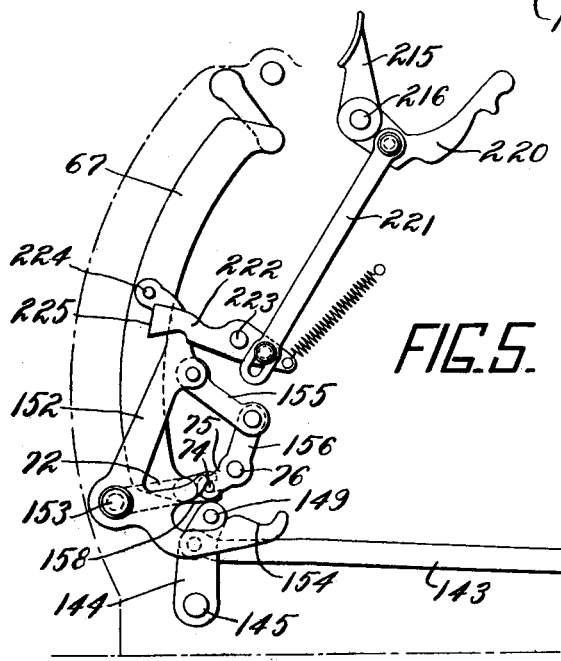
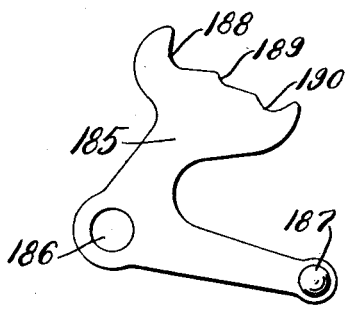
Witnesses
H. F. Sadgebury
J. B. Ricketts
Inventor
Charles F. Kettering
and Wm. A. Chryst
by R. Chilese
Attorney

C. F. KETTERING & W. A. CHRYST.
CASH REGISTER.
APPLICATION FILED MAY 4, 1909.

1,025,277.

Patented May 7, 1912.
7 SHEETS—SHEET 7.

UNITED STATES PATENT OFFICE.

CHARLES F. KETTERING AND WILLIAM A. CHRYST, OF DAYTON, OHIO, ASSIGNORS TO THE NATIONAL CASH REGISTER COMPANY, OF DAYTON, OHIO, A CORPORATION OF OHIO, (INCORPORATED IN 1906.)

CASH-REGISTER.

1,025,277.      Specification of Letters Patent.      Patented May 7, 1912.

Application filed May 4, 1909. Serial No. 493,807.

*To all whom it may concern:*

Be it known that we, CHARLES F. KETTERING and WILLIAM A. CHRYST, citizens of the United States, residing at Dayton, in the county of Montgomery and State of Ohio, have invented certain new and useful Improvements in Cash-Registers, of which we declare the following to be a full, clear, and exact description.

This invention relates to cash registers and has more particular relation to cash registers of the type shown and described in prior applications filed by Charles F. Kettering and William A. Chryst, Serial No. 451,446, on September 21, 1908 and Serial No. 477,419, filed February 11, 1909, to which reference may be had for a complete description of such parts of the machine as do not relate directly to the present invention.

Improved mechanism has been provided whereby the operating mechanism is released by the operation of the clerks' and transaction keys without the operation of an additional releasing means.

The invention further provides special counters for the transaction keys with improved mechanism for operating the same.

Another object is to provide an improved autographic attachment with means for compelling an operation of the same.

A further object is to provide manipulative means whereby the machine may be adjusted to actuate the feeding mechanism for the autographic strip at every operation of the machine, or simply when one of the transaction keys has been depressed. The said manipulative means may further be adjusted to entirely eliminate the feeding operation.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1:
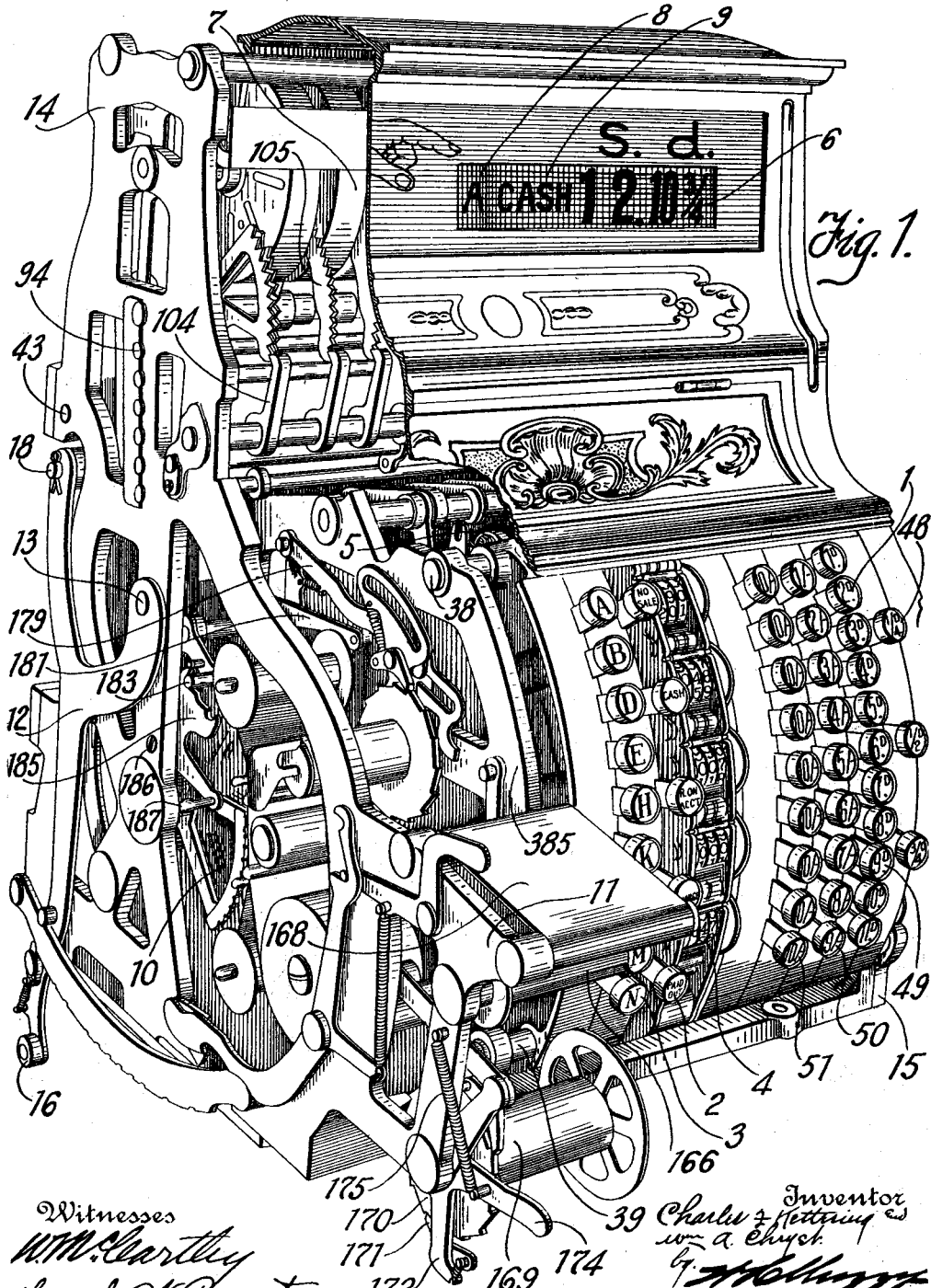
Figure 2:
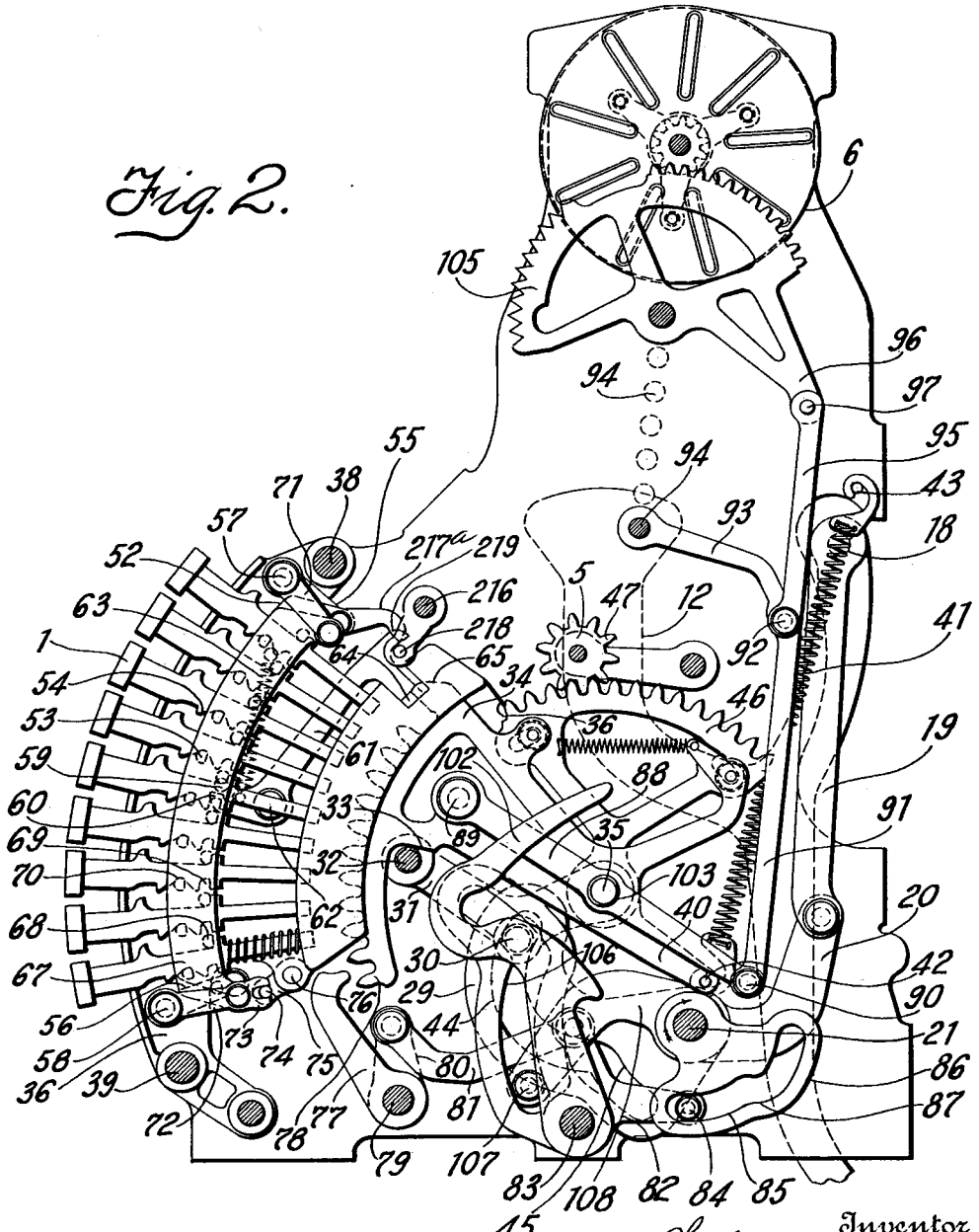
Figure 2A:
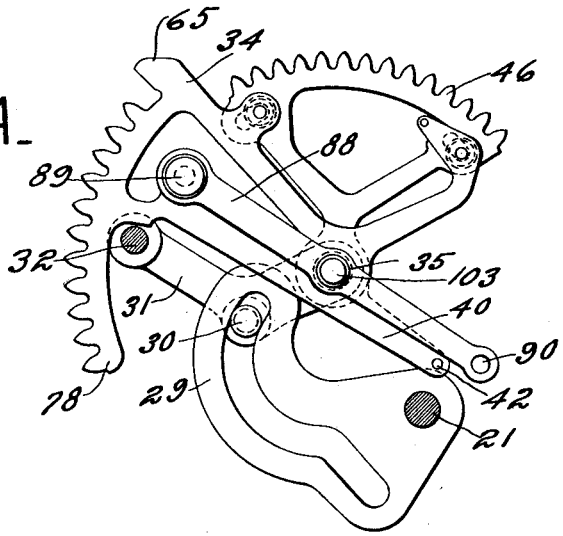
Figure 3A:
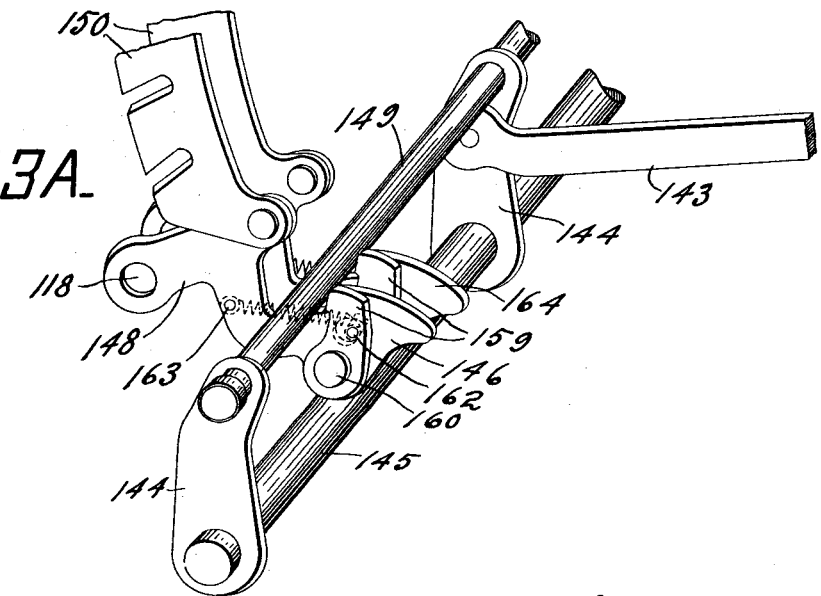
Figure 6:
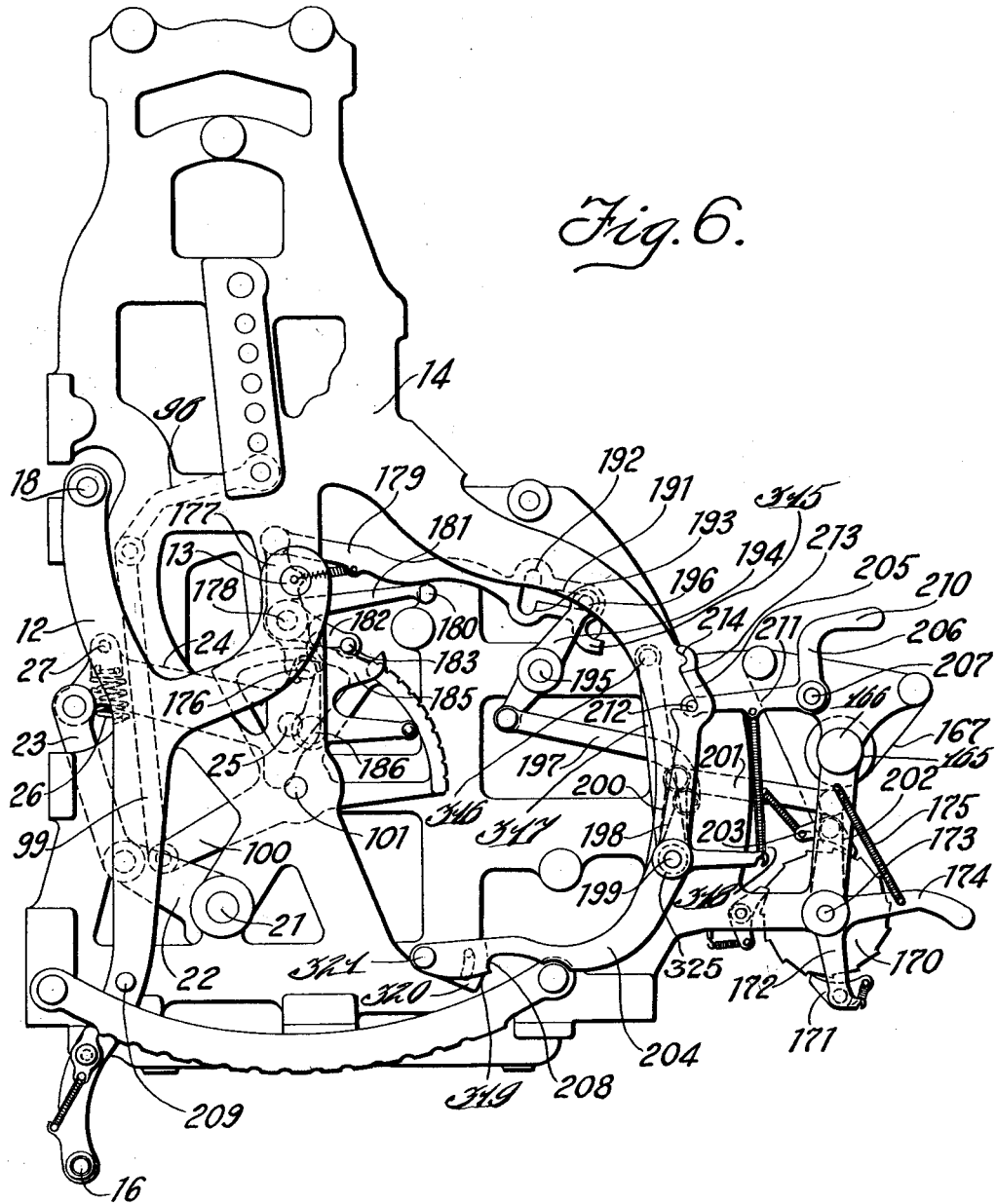

Of said drawings: Figure 1 is a perspective view of the entire machine with the cabinet partially broken away. Fig. 2 is a transverse vertical section of the machine. Fig. 2ᴬ is a detail of part of the differential mechanism shown in Fig. 2. Fig. 3 is an enlarged detail side elevation of part of the drawer releasing mechanism. Fig. 3ᴬ is a perspective view of part of the drawer releasing mechanism. Fig. 4 is an enlarged side elevation of the bank of special keys, showing the construction of the special counters. Fig. 4ᴬ is an enlarged detail of one of the special or transaction counters. Fig. 5 is a detail of the resetting key and mechanism operating in connection with the same. Fig. 6 is a left side elevation of the machine with the cabinet omitted, and showing the printing and autographic mechanisms. Fig. 6ᴬ is a detail view in side elevation of latching mechanism shown in Fig. 6. Fig. 7 is an enlarged detail view of the special type carrier. Fig. 8 is an enlarged detail view of a device which is also shown in Fig. 6.

The machine is of the drawer operated type, that is, the driving mechanism is actuated by the opening and closing of the cash drawer. The drawer is normally spring pressed outward, but is held in its closed position by a latch which is operated to release the drawer, upon the depression of a combination of keys. The drawer then opens under the spring action and is returned by hand to its closed position. Upon the return movement of the drawer the record which is set up on the keyboard is recorded by the machine. For instance, if a cash sale is being recorded, the amount of the record will be added to the totalizer, will be indicated and will be printed upon a detail strip. If a special transaction, such as "no sale", "received on account", "charge", or "paid out", is recorded, the totalizer will not be operated, but the record of the transaction will be printed upon the detail strip and also indicated. All cash and special transactions which are recorded are counted by counting devices, there being one of these devices for each one of the special keys and one for the cash key. The machine is also provided with an autographic device which is arranged to feed a strip of paper over the writing support, winding the same upon a receiving roll which is located within the casing of the machine. The autographic device is for the purpose of receiving written notations regarding transactions, and the paper feeding mechanisms of the autographic device and of the detail strip, operate to feed their respective strips uniform distances upon each operation of the machine, thereby permitting the written records to be easily compared with the printed records to which they relate. The autographic device is arranged with a manipulative device which is adapted to coöperate with other mechanisms in such a way as to compel an operation of the manipulative device when any transaction is recorded, or it may be set to compel the operation of the manipulative device only when a special transaction is recorded, or it may be set to permit the operation of the machine when any transaction is recorded, regardless of an operation of the manipulative device.

Referring to the drawings, Fig. 1 shows the general arrangement of the machine. The particular machine shown is provided with four banks of value keys 1, one bank of transaction keys 2, and one bank of initial keys 3, a plurality of transaction counters 4, a cash totalizer 5, amount indicators in two sets 6 and 7, one set 6 for indicating at the front of the machine, and the other set 7 for indicating at the rear of the machine, an initial indicator 8 which is provided with two sets of characters, one set for indicating at the front of the machine and the other set for indicating at the rear of the machine, and a transaction indicator 9 which is similarly provided with two sets of characters, a printing device 10 and an autographic device 11. Power is applied to the machine by means of a pair of levers or drawer arms 12, which are pivoted on pins 13 at opposite sides of the machine to the side frames 14 and 15. The normal position of the levers 12 with the drawer closed is, as shown in Fig. 1. The levers are each provided with a roller 16, which bears against the rear wall of the cash drawer. As shown in Fig. 5, the drawer is normally held in its closed position by the drawer lever latch 17. Each arm 12 has pivoted thereto at 18 a link 19 (Fig. 2), which connects the drawer arm to an arm 20 which is fixed to a shaft 21. This shaft also carries an arm 22 (Fig. 6) which is connected by a link 23 with an arm 24, which is pivoted to one of the frames of the machine at 25. A spring 26 is interposed between a pin 27 on the arm 24 and a pin extending from the base plate of the machine and normally tends to draw the rear end of said lever 24 downward. The drawer latch 17 is operated to permit the opening of the cash drawer by the depression of an initial key and one of the transaction keys, as will be hereinafter described. When the drawer latch is operated to release the drawer, the spring 26 will cause the arms 12 to rock forwardly, driving the cash drawer to its open position, the connection between the spring 26 and the arms 12, as before mentioned, being the arm 24, link 23, arm 22, shaft 21, arm 20 and links 19. The shaft 21 carries a pair of slotted cams 29, which coact with rollers 30 on a pair of arms 31, pivoted on studs 35 on the side frames of the machine. These arms carry a rod 32 which extends between the two arms 31 and beneath the shoulders 33 of segments 34 which are concentrically but independently and loosely journaled on studs, in line with studs 35, on frames 36, which are secured to the frames 15 and 385 of the machine by the tie bars 38 and 39, Figs 1 and 2. Each of the segments 34 extends rearwardly of its pivot 35, as indicated at 40 (Fig. 2), and springs 41 are interposed between the pins 42 of the rearward extensions 40 of the segments 34 and a rod 43, which is mounted in the side frames 14 and 15. Therefore, these springs normally tend to rock the segments 34 downwardly at their forward ends by drawing upwardly upon the rearward extensions 40 of the segments, but the rod 32 must first be lowered to permit such movement of the segments. The lowering of the rod 32 occurs upon the rocking of the shaft 21 in the direction of the arrow in Fig. 2, when the cams 29 through their co-action with the rollers 30 on the arms 31, which carry the rod 32, cause said arms 31 to rock downwardly. The slots 44 in the cams 29 are concentric with the shaft 21 at 45. Therefore, the arms 31 are held immovable in their lowest position during the latter part of the rocking of shaft 21, the purpose of which will hereinafter be described. There is one segment 34 for each denomination of the totalizer 5, and each of the segments 34 carries a segmental rack 46, which is adapted to mesh with a pinion 47 of the totalizer of corresponding denominational order. The four right hand segments are controlled by the banks of value keys. The extreme right hand segment is controlled by the fractions of pence bank 48. The segment 34 of next higher order is controlled by the pence bank 49, the next segment by the shillings bank 50, and the next segment by the tens of shillings bank 51. There are two more segments 34 of higher order which are not controlled by value keys, but serve in carrying operations from the pinions of lower denominational order of the totalizer to the two pinions of higher denominational orders, namely, the pounds pinion and the tens of pounds pinion.

The value keys 1 control their respective segment 34 as follows: Fig. 2 illustrates one of the banks 50 or 51. The banks 48 and 49 are identical to these banks in principle, but the bank 48 is provided with only three keys and the bank 49 is provided with eleven keys, whereas the banks 50 and 51 each have nine keys. The difference is that the banks 50 and 51 control the rotation of corresponding pinions of the totalizer from one to nine units of movement of a total of ten units to a rotation; the bank 48 one to three of a total of four, and the bank 49 one to eleven of a total of twelve. Each bank of keys is provided with a plate 52 which is provided with a plurality of pins 53, one of which is located beneath each key in position to co-act with a cam surface 54 at the lower side of the key, so that the depression of any key will cause the plate 52 to move downward. Each plate 52 is carried by a pair of arms 55 and 56 which are pivoted respectively at 57 and 58 to the frames 36. Each of the slides 52 also carries a pin 59 which, when the slide moves downward, engages the forward arm 60 of a bell crank 61, pivoted at 62, and rocks the bell crank against the action of a spring 63 to carry the laterally extending arm 64 of the bell crank away from a shoulder 65 of the segment 34 and thereby permits the segment 34 to move downward upon the lowering of rod 32. If no key is depressed, the bell crank 61 will remain in its normal position, thereby preventing downward movement of the segment 34 of such bank. The extent of downward movement of the segment is determined by the particular key which is depressed, as the shank of the depressed key extends into the path of the shoulder 65 of the segment. Upon the full depression of any key, the pin 53 appropriate to such key will spring up back of the shoulder on said key formed by its cam surface 54, and thus hold it in its depressed position. If an error has been made in the depression of a key, such error may be corrected by simply depressing the proper key. This depression of a second key will cause a downward movement of plate 52 to a sufficient extent to release the previously depressed key. The depressed keys are locked in their depressed position during the operation of the machine by a detent 67 which is provided with a plurality of pins 68 which, when the detent is rocked upwardly, enter the notches 69 of the undepressed keys and thereby prevent their depression. The pins 69 appropriate to the depressed keys also enter the notches 70 of the keys which are depressed and thereby prevent their release. The detent 67 is carried by a pair of arms 71 and 72 which are pivoted respectively at 57 and 58. The lower arms 72 are forked, as indicated at 73. A rod 74 extends between the prongs of the forks 73 and is carried by a pair of arms 75, which are fixed to the shaft 76. This shaft is rocked at the proper times to move the detents upwardly and then return the same to their initial position by mechanism which is illustrated in Fig. 5, and which will be described in connection with the description of the banks of initial and special keys.

When the rod 32 is in its lowest position, that is, while the roller 30 is traveling in the concentric part 45 of the slot 44 in the cam 29, alining pawls 77 are rocked into engagement with the alining teeth 78 of the segments 34 and retain the segments in their set positions. The alining pawls 77 are all fixed to a shaft 79 which carries an arm 80, which is connected by a link 81 to one arm of a bell crank lever 82, which is loosely pivoted at 83. The other arm of the bell crank lever 82 is provided with a roller 84, which extends through the slot 85 in a cam 86, which is fixed to the oscillating shaft 21. The cam slot 85 is concentric with the shaft 21 for the greater part of its length, but is offset slightly at 87 for the purpose of actuating the bell crank lever 82, and thereby rocking the pawls 77 into engagement with the teeth 78 when this part of the cam slot arrives at the roller 84. The cam slot 85 is continued beyond such offset, said continuation also being concentric to the shaft 21, although on an arc of greater radius than the forward part of said slot. This serves to maintain the engagement of the pawls 77 with the teeth 78. At the time the segments 34 are locked in their set positions, the totalizer, which is carried on the rocking frame, is rocked into mesh with the segmental racks 46 which are carried by the segments 34, and upon the return of the segments to their normal positions, the totalizer pinions will be rotated to an extent commensurate with the value of the key which has been depressed. For instance, if the uppermost or "one" key in a bank has been depressed, the totalizer pinion appropriate thereto will be given one unit of rotation, whereas if a key of higher value has been depressed, for instance, the "five" key, the totalizer pinion will be given five units of rotation. Each of the segmental racks 46 except the one of lowest order is capable of receiving an extra unit of movement under the influence of a spring independently of the movement of the segment 34. This extra unit of movement of the segmental racks 46 is permitted only when a transfer is to be effected from a pinion of lower order to a pinion of higher order. The totalizer and the transfer mechanisms are not illustrated in the drawings, as they form no part of the present invention, but for a complete description of these devices, reference may be made to the hereinbefore mentioned co-pending applications.

The indicators and type carriers are adjusted according to the extent of downward movement of the four right hand segments 34, at the time the segments 34 are locked in their set positions. Each of these segments 34 is provided with a beam 88 pivoted at 89 on said segment, which beam extends rearwardly and is pivotally connected at its rear end to the lower end of a link 91. The link 91 is pivoted at 92 to an arm 93, which is fixed to one of a series of shafts 94. A link 95 extends upward from the pivot 92 and is pivoted at 97 to the segmental racks 96. Each of the shafts 94 extends through to the left hand side of the machine where it carries an arm 98 (Fig. 6), which is connected by a link 99 to a type carrier 100 which is loosely pivoted at 101. The shaft 94 carries another arm similar to the arm 93, which connects the shaft 94 through a link similar to the link 95 to a segment gear similar to 96 which meshes with a pinion rigid with one of the indicators 7, which is arranged to be read at the rear of the machine. The mechanism just described is that which connects one of the differential segments 34 with its respective pair of indicators 6 and 7 and its respective type carrier 100. The remaining banks are similarly connected to their respective indicators and type carriers. The indicators and type carriers are set as follows: When the four right hand segments 34 move downward the forward ends of beams 88 will be rocked downward from their pivots 90 until the segments 34 are locked in their set positions, while their pivotal points 90 will remain stationary. V shaped cams 102, rigidly mounted on shaft 83, are then rocked rearwardly to engage the rollers 103, mounted on beams 88, and cause the beams 88 to rock upward at their rear ends from their pivots 89, exactly the same extents as they were previously rocked downward at their forward ends from their pivots 90, while their pivotal points 89 remain stationary. A previous operation of the machine however, may have left the beams in other than zero positions in which case they would be rocked by cams 102 an extent corresponding to the difference between the previous setting of the beam and its present setting. The result is that shafts 94 are differentially rocked the desired extents to rotate the indicators and type carriers directly from their previous setting to the desired new setting. The alining pawls 104 (Fig. 1), which co-act with the alining teeth 105 of the segmental racks 96, serve to lock the segmental racks against movement while the beams 88 are being rocked from their pivots 90. Then, when the segments 34 are locked in their moved positions by the alining pawls 77, and the beams are to be rocked from the pivots 89, the alining pawls 104 are rocked and held away from the teeth 105, thus permitting the beams 88 to rock from their pivots 89. The shaft 83 also carries a pair of cams 106, which are suitably slotted for the purpose of co-acting with rollers 107, carried by arms 108 which are carried by the shaft 21 for the purpose of causing the cams 102 to be actuated at the proper time. The transaction keys 2 and initial keys 3 control segments 34, but these particular segments are not provided with segmental racks 46, and, therefore, do not effect an operation of the totalizer 5, but they are connected in the same manner as the other segments to indicators and type segments.

*Transaction keys and transaction counters.*—Fig. 4, is a side elevation of the bank of transaction keys and related mechanism, and illustrates how the transaction counters are actuated. Certain parts of the mechanism are omitted in this view for the sake of clearness, as the transaction keys are all similar in construction and control transaction counters which are all similar in construction. The lowest or "Paid out" key with its respective counter is shown in full, while the first from the lowest, or "Charge" key, is shown with only part of the mechanism of its respective counter. The second from the lowest key or the "Received on account" key, is shown alone or without its respective counter. The "Cash" key or the third from the lowest is shown in connection with a device which prevents the depression of more than one key at a time in the bank. The highest or "No sale" key is omitted. Each key is provided with a lug 109, which, upon the depression of the key, engages a pin 110 extending from the side of a pivoted arm 111, and rocks the arm 111 against the action of a spring 112 carrying the pin 110 into one of the notches 113 in a plate 114, which is carried by a pair of arms 115 and 116 loosely pivoted at 117 and 118 respectively, and is common to all of the transaction keys. The plate 114 is provided with a rearwardly extending arm 119 and at its rearward end said arm carries a pin 120 which extends through a slot 121 in an arm 122 fixed to the shaft 79 on which the alining pawls 77 are mounted. Therefore, when the shaft 79 is rocked to carry the alining pawls 77 into engagement with the alining teeth 78 of the segments 34, as previously described, the plate 114 will be moved upwardly through the engagement of the arm 122 with the pin 120. The arm 111 is pivotally mounted upon an arm 123 at 124. The arm 123 is pivoted to the frame 125 of the bank of special keys at 126, and at 127 carries a roller which extends through a slot 128 in an extension 129 of a frame 130, which carries at 131 a multipronged pawl 132. The pawl 132 is adapted to engage ratchets 133 which are fixed to the counter wheels 134. When the plate 114 is moved upwardly it will carry with it the arm 111 whose pin 110 has been moved into one of the notches 113 in the plate and will thereby cause the arm 123 to be rocked upwardly from its pivot 126. This arm through its connection with the frame 130 will cause the frame 130 to rock downwardly from its pivot 135, and the multipronged pawl will thereupon actuate its respective counter. The counter itself is of the well known step by step type, and needs no further description here.

Each transaction key carries a pin 137, which, when the key is depressed, passes between a pair of arms 138 and 139 which are pivoted to the frame 125 at 140 and 141 respectively. The arms 138 and 139 of different pairs are connected together by links 142. Therefore, the movement of any one pair of arms will be communicated to the remaining pairs and these are arranged so that there will be only enough play between all of the arms to permit the passage of only one of the pins 137 between its respective arms 138 and 139. Because of this arrangement it is impossible to depress more than one transaction key at a time.

The transaction keys and the clerks' initial keys control the drawer releasing mechanism. The drawer latch lever 17, as shown in Fig. 5, is connected at its upper end by a link 143 to one of three arms 144 which are pivoted at 145, also shown in Fig. 3. In order to permit the opening of the cash drawer under the action of the main spring 26, the drawer latch lever 17 must be permitted to rock forward at its lower end from its pivot 146, and in order to permit such rocking of the drawer latch lever, the link 143 must be allowed to move rearwardly. Said link is normally prevented from moving rearwardly by the shoulders 147 of the arms 148, which are pivoted at 118 to the supporting frames for the banks of initial and transaction keys. The shoulders 147 normally stand in the path of the rod 149, which is carried by the arms 144 and, in order to permit the arms 144 to rock rearwardly and thereby permitting the cash drawer to move to its open position, the arms 148 must be rocked downwardly from their pivots 118 to withdraw said shoulders from the path of the said rod 149. The arms 148 are pivoted to plates 150 which, at their upper ends, are supported by arms 1515, which are pivoted to the supporting frames of the two banks at 117. The plates 150 are provided with slots 151 located opposite pins 137, carried by the keys. These slots extend upwardly from the path of movement of the pins 137. Therefore, upon the depression of one of the keys, the plate 150 for such bank will be moved downward through the engagement of the pin 137 with the slot 151. The downward movement of the plate 150 causes the arms 148 to rock downwardly clear of the rod 149 thus permitting the link 143 to move rearwardly and allowing the cash drawer to move to its open position. As there is one such mechanism as illustrated in Fig. 3 for the bank of clerks' initial keys, and one for the bank of special transaction keys, it is necessary to depress a key in each of these banks in order to operate the machine, the rod 149 and drawer latch mechanism being common to both banks. Each of the arms 148 (Fig. 3), is provided with a spring drawn pawl 159 which is pivoted to the arm 148 at 160. The spring 161 which actuates the pawl is interposed between a pin 162 of the pawl and a pin 163 of the arm 148. When the arm 148 is rocked downward on the depression of a key, the pawl 159 springs below the rod 149 and prevents the return of the arm 148 and thereby the return of the slide 150. But when the arms 144 rock rearwardly, the surface 164 of the arm 148 by co-acting with the rod 149, prevents the return of the arm 148 and the consequent release of the depressed key. The purpose of the pawl 159 is to insure that either the transaction or the initial key which is first depressed will be retained in its depressed position until the other one of these keys is depressed, as it is necessary to depress both an initial key and a transaction key before the rod 149 will move rearwardly. When the drawer is pushed inward, the rod 149 is again rocked forward toward normal position. It is essential, however, to push the drawer in past its normal position to cause the rod 149 to move past its normal position to an extent sufficient to permit the arm 148 and pawl 159 to spring up back of said rod 149, thus releasing the depressed key. When the restoring pressure, is then removed from the drawer it will move slightly outward to normal position, thus causing the rod 149 to rock back to normal position to restore the spring pawl 159 and again engage the shoulder 147.

The rod 149 extends through to the right hand side of the machine where it is supported by one of the arms 144 (Fig. 5). The rod 149, as shown in this figure, coacts with an arm 152 which is pivoted to the frame of the machine at 153. It is provided with a camming surface at 154, which is engaged by the rod 149 when the same rocks rearwardly and, therefore, causes the arm 152 to rock rearwardly. This arm is connected by a link 155 with a lever 156 which is fixed to the shaft 76. The shaft 76 carries the arms 75 which are located at opposite sides of the machine and carry the rod 74. This rod co-acts with the forks 73 of the arms 72 which carry the key detents 67 (Fig. 2). Therefore, when the arm 152 is rocked rearwardly the rod 74 will be moved upwardly a slight distance carrying all of the key detents upwardly and thereby locking the keys against movement. The rod 74 is again moved down to release the keys at the completion of an operation of the machine when the roller 157 which is carried by the rear wall of the cash drawer engages the drawer latch 17 and thereby returns the drawer latch to its normal position, and through this rod in returning engages an extension 158 of the arm 152, thereby returning the arm 152 to its initial position.

In printing the total of all items which have been accumulated by the totalizer all that is necessary in operating the machine is to depress the totalizing key 215 (Fig. 5), and then return the cash drawer to its home position. The key 215 is fixed to the shaft 216, which shaft carries a pair of arms 217 (Fig. 3), between which extends the rod 218. Upon the depression of the key 215, the rod 218 co-acts with the inclined surfaces 219 of the arms 1515 to force said arms downward, and cause the slides 150 of the transaction and clerks' banks to move downward, thereby releasing the cash drawer, in the manner above described. At the same time the rod 218 (Fig. 2) moves into the path of the rearward extensions 217$^a$ of the arms 55, which carry the detents 52 and when in the path of these arms prevents the depression of any of the amount keys. The rod 218 also engages the shoulders 219 of all of the stops 61 and rocks the stops out of the paths of the shoulders 65 of the segments 34. Therefore, all of the segments 34 will move downward upon the opening of the cash drawer, each segment moving downward to an extent commensurate with the amount which has been accumulated by its appropriate totalizing element. The totalizer is retained in engagement with the segmental rack 46 upon the depression of the key 215 during the downward movement of said segments 34, in a manner fully shown and described in the before mentioned copending applications. Upon this forward movement of the segment gears 46, the totalizer pinions are rotated backwardly to their zero position, but as this backward rotation of the totalizer pinions is equal to the amount which the totalizer pinions had been rotated forwardly from their zero positions, the type carriers will be set to bring the characters which represent the total amount which has been accumulated by the totalizer to the printing line. Therefore, when the platen of the printer is operated, an impression of the total will be made. A complete description of the printing mechanism may be found in the before mentioned patent applications. The shaft 216 (Fig. 5) carries an arm 220 which is connected by a link 221 with an arm 222 pivoted at 223. Upon the depression of the key 215, the arm 222 co-acts with a pin 224 carried by the lever 152 to prevent the lever 152 from moving rearwardly unless the key 215 is fully depressed. Fig. 5 shows the key 215 in its normal position and the forward end of the arm 222 is shown below the pin 224 and, therefore, does not prevent the rearward rocking of the lever 152, upon ordinary operations of the machine. When the key 215 is fully depressed, the arm 222 will be above the pin 224, and thereby permits the lever 152 to rock rearwardly, but it is impossible to operate the machine with the key 215 only partly depressed as then the surface 225 of the arm 222 will be directly in the path of the pin 224 and will thereby hold the lever 152 in engagement with the rod 149 and prevent the release of the cash drawer.

*Autographic device.*—The autographic device is illustrated in Figs. 1 and 6. A supply roll of autographic paper 165 is carried by the rod 166 which extends from the frame 11. The paper 167 is led from the supply roll over the writing table 168 and from there to the cylinder 169 to which is rigidly secured a ratchet 170. This ratchet may be actuated to cause the feed of the paper either by hand or by devices which are operated by the register itself. The hand feed consists merely of a pawl 171 which is carried by an arm 172 pivoted upon the shaft 173 of the cylinder 169 and provided with a forwardly extending handle 174. A spring 175 is interposed between the handle and a pin extending from the frame 11. The hand feed is operated by merely pressing the handle 174 downwardly, thereby rotating the ratchet 170 a slight distance and upon the release of the handle 174 it is returned to its initial position by the spring 175.

The paper feeding device which is operated by the machine may be set so that it will feed upon every operation of the machine or only upon certain operations of the machine, as when special transactions such as "received on account", "charge", or "paid out", are recorded, or not to feed on any operation of the machine. Another device is provided in connection with the autographic mechanism which must be operated before the machine can be operated if the paper feeding device is set to feed upon the operation of the machine. This is merely to call attention to the autographic mechanism whenever the paper feeding device is set to operate.

Referring to the drawings (Fig. 6), the arm 24 which is pivoted at 25 and oscillated upon each operation of the machine, has an upwardly extending part which is provided with a roller 176 which extends between the prongs of a forked lever 177. This lever is loosely pivoted at 178 to the side frame 14 and extends upwardly from its pivot and at its upper end is pivoted to a slide 179. This slide rests upon a roller 180 which is carried by an arm 181, fixed to the shaft 178 which also carries an arm 182, provided with a rod 183, which extends across the upper edge of the type carrier 184 (Fig. 7), which is controlled by the bank of transaction keys. The rod 183 also extends across a notched arm 185 (Fig. 8), which is pivoted to the side frame at 186, and at 187 is provided with a handle by means of which it may be manually rocked from its pivot 186, so that any one of the three notches 188, 189 and 190 may be brought in such position that the rod 183 will rest in the selected notch. These notches are arranged at different distances from the pivot 186 of the arm 185, the notch 188 being nearest the pivot and the other two 189 and 190 being successively farther away from the pivot. Therefore, by manipulation of this arm 185 the rod 183 may be placed in three different positions and the roll 180 accordingly positioned. If the lever 185 is rocked to bring the notch 190 into engagement with the roll 183, the roller 180 will move to its highest position rocking the slide 179 upwardly. With the rod 183 resting in the notch 189, the slide 179 will be in the position shown in Fig. 6. With the rod 183 resting in the notch 188, the slide 179 will be in its lowest position. This slide 179 is provided with a slot 191 which is notched at 192 and 193. A lever 194 which is pivoted at 195 carries a roller 196 which extends into the slot 191. If the roller 196 is in either one of the notches 192 or 193, the reciprocation of the slide 179 will cause the lever 194 to be rocked forwardly and returned upon the operation of the machine. Below its pivot the lever 194 is connected to a link 197 which at its forward end is pivoted to an arm 198 which is rigidly mounted upon a sleeve 325 surrounding the shaft 199. This sleeve also carries an arm 200 which, by the link 201, is connected to an arm 202, which is pivoted on shaft 173, and carries a feed pawl 203. Therefore, when the lever 194 is rocked forwardly and returned the feed pawl 203 will engage the ratchet 170 and rotate the same a slight distance, thereby causing the feed of the strip of autographic paper. Fig. 6 shows the autographic mechanism as it would appear when in its normal or home position. The roll 196 is in the extreme forward end of the slot 191 and the arm 24 is in its upper or home position. Therefore, in order to rock the slide 179 to bring the notches 192 or 193 into engagement with the roller 196, the slide 179 must be rocked when the autographic mechanism is in its moved position, at which time the roller 196 is opposite the notches 192 and 193. If the slide 179 is in such position that the roller 196 is centrally located between the notches 192 and 193, then the operation of the machine will not cause the feed of the strip of autographic paper as the slide 179 will not engage the roller 196. In order to bring the slot to its central position the arm 185 should be set to the position in which it is shown in Fig. 6, with the rod 183 resting in the notch 189. If it is desired to cause the autographic feed to operate upon every operation of the machine, then the arm 185 is rocked to bring the notch 190 into engagement with the rod 183 and as the notch 190 is farther away from the pivot 186 of the arm 185, the arm 182 will be rocked upwardly thereby causing the arm 181 to lift the slide 179 so that the roll 196 will rest in the notch 193 of the slide. Then every time the machine is operated, the lever 194 will be oscillated and therefore, the paper feeding device will be actuated. If it is desired to have the strip of autographic paper feed only on certain special operations such as when "received on account," "charge," or "paid out" transactions are recorded, the arm 185 is rocked to bring the notch 188 into engagement with the rod 183, and as this notch is closest the pivot 186 of the arm 185, the slide 179 will be permitted to drop downwardly bringing the notch 192 into engagement with the roll 196. With the roll 196 in the notch 192, the paper feeding device will ordinarily be operated upon the operation of the machine, but the type segment 184 for the bank of special keys is provided with a surface 2045 which co-acts with the rod 183 when it rests in the notch 188 and cams the rod 183 upwardly when the segment is moved to bring either the "no sale," or "cash" characters to the printing line. This lifting of the rod 183 causes the slide 179 to rise to its central position, the rod 183 being lifted the same distance, as it would be lifted when the arm 185 is rocked to bring the notch 189 into engagement with the rod 183. When the "Received on account," "Charge," or "Paid out" key is depressed, one of the cut away parts 2055 of the segment 184, will come opposite the rod 183, and will thereby permit the rod to rest in the notch 188, allowing the slide 179 to lower so that the notch 192 may engage the roller 196.

The type segments are set when the operating mechanism of the machine is in its moved position, that is, the arm 24 will be in its lowest position and the arms 12 in their forward positions. The feed of the strip of autographic paper is accomplished on the return of the operating mechanism of the machine when the slide 179 is moved rearwardly carrying with it the lever 194 provided with the roller 196 is in either of the notches 192 or 193. The rearward rocking of the lever 194 causes the arm 202 which carries the feed pawl 203 to be rocked forward. The autographic device is further provided with a device which, upon the operation of the machine, attracts the attention of the operator to the autographic device whenever the paper feeding mechanism of the strip of autographic paper is set to feed the paper. This device attracts the operator's attention by preventing a complete operation of the machine until the device itself is manually operated. It comprises a latch lever 204 rigidly mounted on the shaft 199.

The lever 204 is provided at its lower end with a hook projection 208, which projection normally stands in a position to be engaged by a pin 209 on the drawer arm 12 for the purpose of locking said arm in its forward position, thus preventing a closing movement of the drawer to complete the operation of the machine. The lever 204 has an upwardly extending arm 205 which coöperates with a bell crank release lever 206. Said lever 206 has mounted on its rearwardly extending arm 211, a pin 212 which coöperates with the inclined edge 213 on the upper end of latch lever 204, to rock said latch lever and shaft 199, thus withdrawing the hook 208 from locking engagement with the pin 209. A notch 214 is provided at the upper end of said inclined edge. This notch is for the purpose of engaging and holding the pin 212 and consequently holding said levers 204 and 206 in operated position. A spring 318 is interposed between said levers for the purpose of restoring them to normal position when released. The forward end of the paper feeding lever 179 is provided with a downwardly extending finger 315, which, when the lever 179 is in a position of no feed, lies in the path of a pin 316, mounted on the upper end of a lever 317, which lever is rigidly mounted on shaft 199. Upon an operation of the machine in such condition the said finger will engage the pin 316 and rock the lever 317 and consequently the shaft 199 and lever 204 to raise the hook 208 out of the path of the pin 209. The machine may then be freely operated without the drawer arm being locked in its forward position. If, however, the lever 179 is in one or the other of its feeding positions, and the pin 196 is riding in either of the notches 192 or 193, the finger 315 will then be out of alinement with the pin 316 and the lever 317, shaft 199 and lever 204 will not be rocked. The locking projection 208 will consequently remain in position to engage the pin 209 and prevent the closing of the drawer. It will then be necessary for the operator to depress the forward end 210 of lever 206, thus causing the pin 212 to coact with the inclined edge 213 of the upper end of lever 204 and thus rock said lever to release the pin 209 and lever 206 will then be locked in operated position, as above described. The lever 204 will in this manner be rocked to an extent sufficient to simply withdraw the hook 208 from the pin 209, while the inclined edge 319 of a pawl 320, pivoted at 321, on the rear end of said lever will still remain in the path of the pin 209. When the drawer is subsequently closed, the pin 209 will strike against said pawl and cause a further rocking movement of the lever 204 to an extent sufficient to release the pin 212 from the notch 214 and thus permit the restoration of lever 206.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is;

1. In a machine of the class described, the combination with a main operating mechanism including a manually movable element, of means for holding said element against actuation, two latching arms normally preventing release of said holding means, two banks of keys and detent plates operated respectively by the keys in said banks, and connections from said plates to actuate separately the two latching arms.

2. In a machine of the class described, the combination with a main operating mechanism including a manually movable element, of means including a bar for normally holding said element against movement, two pivoted latching arms normally preventing movement of said holding bar, two banks of keys, and detent plates operated by said banks respectively, connections from said detent plates to said pivoted latching arms, and a latching pawl mounted on one of said latching arms, and spring drawn to hold the corresponding detent plate in adjusted position.

3. In a machine of the class described, the combination with a main operating mechanism comprising a cash receptacle, of holding means for said receptacle including a pivoted frame having a cross bar, two pivoted latching arms normally preventing movement of said frame bar, two banks of keys and detent plates moved respectively by said keys, connections from said detent plates to release said latching arms, and a holding arm pivoted to one of said latching arms, spring drawn to engage under said frame bar when the corresponding detent plate is actuated and thereby hold said detent plate in its adjusted position.

4. In a machine of the class described, the combination with a main operating mechanism including a manually movable element, of means for holding said element against actuation, two latching arms normally preventing release of said holding means, two banks of keys and connections from said banks for separately releasing said latching arms, and a locking plate having connections to said main operating mechanism and actuated thereby to positively lock one of said banks of keys.

5. In a machine of the class described, the combination with an operating mechanism and a pivoted plate having notches and connected to be given invariable excursions by said operating mechanism, of a series of counters having driving elements, actuating pawls connected to said driving elements and having projecting pins, and keys constructed to engage said projecting pins and force them into the notches of said pivoted plate.

6. In an accounting mechanism, the combination with registering and printing mechanisms, of a series of transaction keys and a printing element differentially controlled thereby, an autographic device including a normally inoperative feeding mechanism for a record material, and a manipulative device for establishing a coöperative relation between said feeding mechanism and transaction printing element whereby said feeding mechanism will automatically be rendered operative only upon the transaction printing element being positioned to print certain transactions.

7. In a machine of the class described, the combination with a main operating mechanism including a movable element, of means for holding said element against actuation, two latching arms normally preventing release of said holding means, two banks of keys, detent plates operated respectively by the keys in said banks, and connections from said plates to actuate separately the two latching arms.

8. In an accounting mechanism, the combination with an operating mechanism, of an autographic device including feeding mechanism and means for rendering said feeding mechanism operative or inoperative at will on all or certain predetermined operations of the accounting mechanism, and a lock for the operating mechanism controlled by said feeding mechanism for preventing a complete operation of the accounting mechanism when said feeding mechanism is in operative condition.

9. In an accounting mechanism, the combination with an operating mechanism, of an autographic device including feeding mechanism and means for rendering said feeding mechanism operative or inoperative at will on all or certain predetermined operations of the accounting mechanism, a lock for the operating mechanism controlled by said feeding mechanism for preventing a complete operation of the accounting mechanism when said feeding mechanism is in operative condition, and a manually operable device for releasing said lock.

10. In an accounting mechanism the combination with registering and printing mechanism and an operating mechanism therefor, of a series of transaction keys and a printing element differentially controlled thereby, an autographic device including a normally inoperative feeding mechanism for a record material, a manipulative device for establishing a coöperative relation between said feeding mechanism and transaction printing element whereby said feeding mechanism will automatically be rendered operative only upon the operation of certain of said transaction keys, and a manually releasable lock for the operating mechanism controlled by said feeding mechanism for temporarily preventing a complete operation of the accounting mechanism when said feeding mechanism is in operative condition.

11. In an accounting mechanism the combination with registering and printing mechanism of a series of transaction keys and a printing element differentially controlled thereby, an autographic device including a normally inoperative feeding mechanism for a record material, a manipulative device constructed by adjustments thereof to render said feeding mechanism operative at every operation of the machine or to establish a coöperative relation between said feeding mechanism and transaction printing element whereby said feeding mechanism will automatically be rendered operative only upon the operation of certain of said transaction keys and inoperative upon the operation of others of said keys and a manually releasable lock for the operating mechanism controlled by said feed mechanism for temporarily preventing a complete operation of the accounting mechanism when said feeding mechanism is in operative condition.

12. In an accounting mechanism the combination with an operating mechanism of an autographic device including an adjustable feeding device for a record material and means for manually rendering said feeding device operative or inoperative and a manually releasable lock for the operating mechanism controlled by said feeding mechanism for temporarily preventing a complete operation of the accounting mechanism when said feeding mechanism is in operative condition.

13. In an accounting mechanism the combination with an operating mechanism of an autographic device including an adjustable feeding device for a record material and means for automatically rendering said feeding device operative or inoperative and a manually releasable lock for the operating mechanism controlled by said feeding mechanism for temporarily preventing a complete operation of the accounting mechanism when said feeding mechanism is in operative condition.

14. In an accounting mechanism the combination with an operating mechanism, of an autographic device including an adjustable feeding device for a record material and means for manually and automatically rendering said feeding device operative or inoperative and a manually releasable lock for the operating mechanism controlled by said feeding mechanism for temporarily preventing a complete operation of the accounting mechanism when said feeding mechanism is in operative condition.

15. In an accounting mechanism the combination with an operating mechanism including a reciprocating lever carrying a pin, of an autographic device including a feeding device for a record material, a pivoted locking lever having a notch and controlled by said feeding device and having a hook adapted to engage the pin mounted on said reciprocating lever to lock said lever in partially operated position, a manually operable release lever adapted to rock said locking lever to disengage its hook from the pin on the reciprocating lever, a pin on the release lever adapted to be engaged by the notch in said locking lever to lock said release lever in operated position and said locking lever in disengaged position, and a pawl mounted on said locking lever adjacent its locking hook and adapted to be struck by the pin on the reciprocating lever in its return movement to give said locking lever an additional rocking movement to disengage its notch from the pin on the releasing lever to permit a restoration to normal position of both of said levers.

16. In an accounting mechanism the combination with an operating mechanism including a reciprocating lever carrying a pin, of an autographic device including an adjustable feeding device for a record material and means for manually and automatically rendering said feeding device operative or inoperative, a pivoted locking lever having a hook adapted to engage the pin on said reciprocating lever to lock said lever in partially operated position, a second lever rigidly connected to said locking lever and a projection on the feeding device in alinement to engage said second lever when said feeding device is in inoperative condition to rock said locking lever to withdraw its hook from locking position but out of alinement to engage said second lever when said feeding device is in operative condition to permit the locking hook to remain in locking position.

17. In an accounting mechanism, the combination with an operating mechanism, of an autographic device including feeding mechanism and means for rendering said feeding mechanism operative or inoperative at will on all or certain predetermined operations of the accounting mechanism, a lock for the operating mechanism controlled by said feeding mechanism for preventing a complete operation of the accounting mechanism when said feeding mechanism is in operative condition and permitting a complete operation of the accounting mechanism when said feeding mechanism is in inoperative condition.

18. In an accounting mechanism, the combination with an operating mechanism, of an autographic device including feeding mechanism and means for rendering said feeding mechanism operative or inoperative at will on all or certain predetermined operations of the accounting mechanism, a lock for the operating mechanism controlled by said feeding mechanism for preventing a complete operation of the accounting mechanism when said feeding mechanism is in operative condition, and permitting a complete operation of the accounting mechanism when said feeding mechanism is in inoperative condition, and a manually operable device for releasing said lock.

19. In a machine of the class described, the combination with an invariably movable operating mechanism, of means for feeding a record strip, a manipulative device controlling connection and disconnection of the feeding means and the operating mechanism, and an element differentially adjusted under the control of the operating mechanism for preventing the connection of the operating mechanism and the feeding means regardless of the position of the manipulative device.

20. In an accounting mechanism, the combination with an operating mechanism, of an autographic device including feeding mechanism, means for rendering said feeding mechanism operative or inoperative at will on all or certain predetermined operations of the accounting mechanism, and means for attracting the attention of the operator to the record strip before the strip is fed, when the feed mechanism is in operative condition.

In testimony whereof we affix our signatures in the presence of two witnesses.

CHARLES F. KETTERING.
WILLIAM A. CHRYST.

Witnesses:
W. P. ANDERSON,
F. E. HAMILTON.

Copies of this patent may be obtained for five cents each, by addressing the "Commissioner of Patents, Washington, D. C."